(12) United States Patent
Tada

(10) Patent No.: US 6,798,552 B2
(45) Date of Patent: Sep. 28, 2004

(54) SEMICONDUCTOR LIGHT MODULATOR

(75) Inventor: Hitoshi Tada, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 26 days.

(21) Appl. No.: 10/197,559

(22) Filed: Jul. 18, 2002

(65) Prior Publication Data

US 2003/0156311 A1 Aug. 21, 2003

(30) Foreign Application Priority Data

Feb. 18, 2002 (JP) ........................................ 2002-039868

(51) Int. Cl.[7] .............................. G02F 1/03; G02F 1/035
(52) U.S. Cl. ........................... 359/248; 359/247; 385/2; 385/8
(58) Field of Search ................................ 359/248, 247; 385/1, 2, 3, 131; 257/14, 80, 96

(56) References Cited

U.S. PATENT DOCUMENTS

| | | | |
|---|---|---|---|
| 5,604,762 A | * | 2/1997 | Morinaga et al. .............. 372/43 |
| 5,606,176 A | * | 2/1997 | Nitta ............................. 257/18 |
| 5,956,358 A | | 9/1999 | Sasaki |
| 6,091,745 A | * | 7/2000 | Nitta ............................. 372/27 |
| 6,255,707 B1 | * | 7/2001 | Bylsma et al. ............... 257/414 |
| 6,477,283 B1 | * | 11/2002 | Shimizu et al. ................ 385/3 |
| 6,577,660 B1 | * | 6/2003 | Muroya ......................... 372/45 |

FOREIGN PATENT DOCUMENTS

| | | |
|---|---|---|
| JP | 61-212823 | 9/1986 |
| JP | 5-259567 | 10/1993 |
| JP | 8-236857 | 9/1996 |
| JP | 8-248363 | 9/1996 |

OTHER PUBLICATIONS

Wakita et al., "A New Electroabsorption Modulator With Full Negative Chirp Operation Using A Parallel Field", 2001 International Conference on Indium Phosphide and Related Materials Conference Proceedings, IPRM, May 2001, pp. 151–154.

* cited by examiner

Primary Examiner—Hung Xuan Dang
Assistant Examiner—Tuyen Tra
(74) Attorney, Agent, or Firm—Leydig, Voit & Mayer, Ltd.

(57) ABSTRACT

A band discontinuity reduction layer having a band gap energy larger than that of that of an MQW (multiple quantum well) absorption layer and smaller than that of a p-InP clad layer is provided between the MQW absorption layer and the p-InP clad layer. In addition, a band discontinuity reduction layer having a band gap energy larger than that of the MQW absorption layer and smaller than that of an n-InP clad layer is provided between the MQW absorption layer and the n-InP clad layer. Consequently, as a pile-up of carriers is suppressed, a semiconductor light modulator with an enhanced response speed can be obtained.

12 Claims, 4 Drawing Sheets

SEMICONDUCTOR LIGHT MODULATOR

BACKGROUND OF THE INVENTION

1. Field of the Invention

The present invention relates to a semiconductor light modulator which can control an amount of light transmission by applying a prescribed voltage to an active layer sandwiched between two clad layers of different conductivity types.

1. Description of the Background Art

A small semiconductor light modulator capable of low voltage operation and having a small wavelength variation (chirping) is widely used in a large capacity optical communication system employing an optical fiber. The large capacity optical communication system is becoming more popular in these days as the Internet becoming more widespread, and there is a great need to enhance a response speed of the semiconductor light modulator.

In general, a reduction of a device capacity is essential to enhance a response speed (a bandwidth) of a light modulator using a semiconductor. In a conventional semiconductor light modulator, a low voltage operation and a high extinction ratio are obtained by applying a voltage to a light absorption layer as an active layer, utilizing a Franz-Keldysh effect in a bulk absorption layer and utilizing a quantum confined Stark effect in a multiple quantum well (MQW) structure.

Commonly, a so-called p-i-n structure is widely used as a semiconductor light modulator, which is constructed by sandwiching a light absorption layer with semiconductor layers respectively including a p-type impurity and an n-type impurity from upside and downside. In order to reduce a device capacity in this semiconductor light modulator, it is necessary to increase the thickness or to decrease the width of the light absorption layer.

Increased thickness of the light absorption layer, however, causes a higher operation voltage and, moreover, a connection property with an optical fiber will be degraded (an insertion loss will be increased) because an amount of confined light in the light absorption layer will increase as the light absorption layer with a high refractive index becomes thicker. In addition, an extinction ratio will become lower when the width of the light absorption layer is decreased. Therefore, it is impossible to obtain a semiconductor light modulator which satisfies all of the required properties, that is, an enhanced response speed (a broadband (a reduced capacity)), a high extinction ratio, a low voltage operation, and a low insertion loss.

In references such as Japanese Patent Laying-Open Nos. 61-212823, 8-248363, and Proc. IPRM 2001 pp. 151–154 WP-06, a semiconductor light modulator having a structure different from that mentioned above is proposed to realize the semiconductor light modulator which can satisfy all those properties. In contrast with the conventional semiconductor light modulator which has the p-i-n structure formed in a stacking direction, the semiconductor light modulator described in these references has the p-i-n structure formed in a horizontal direction perpendicular to the stacking direction, which enables an individual control of a device capacity and a spot size of light to satisfy all the required properties, i.e., a low voltage operation, a high bandwidth, a low insertion loss, and a high extinction ratio.

A problem still remains, however, in the semiconductor light modulator having the p-i-n structure formed in a horizontal direction as described in the above-mentioned references. Generally, in a semiconductor light modulator, an InGaAsP bulk or an MQW (Multiple Quantum Well) structure is used in a light absorption layer, and InP is used in a clad layer. As InP and InGaAsP have different band gap energies, there is a high hetero barrier between the light absorption layer and the clad layer. Because of this hetero barrier, carriers (holes or electrons) generated within the light absorption layer especially during a high light input pile up near the hetero barrier, which degrade the response speed of the semiconductor light modulator.

SUMMARY OF THE INVENTION

An object of the present invention is to provide a semiconductor light modulator having an enhanced response speed by suppressing a pile-up of carriers due to a hetero barrier.

A semiconductor light modulator according to a first aspect of the present invention includes a semi-insulating substrate, a first conductivity type clad layer formed on the semi-insulating substrate, a second conductivity type clad layer having a conductivity type different from that of the first conductivity type clad layer and formed on the semi-insulating substrate in the same height position as the first conductivity type clad layer aligned with a prescribed space, an active layer provided between the first conductivity type clad layer and the second conductivity type clad layer, and a band discontinuity reduction layer provided between the active layer and the first conductivity type clad layer and having a band gap energy larger than that of the active layer and smaller than that of the first conductivity type clad layer.

According to the above-mentioned structure, the pile-up of carriers can be prevented by the band discontinuity reduction layer provided between the active layer and the first conductivity type clad layer and having a band gap energy of a magnitude between that of the active layer and that of the first conductivity type clad layer. As a result, the response speed of the semiconductor light modulator can be enhanced.

More preferably, the semiconductor light modulator according to the first aspect of the present invention includes a buffer layer provided between the active layer and the band discontinuity reduction layer and having a thickness enabling a tunneling of an electron or a hole at a voltage during use. The buffer layer is formed of a material that enables the band discontinuity reduction layer to be formed directly on the buffer layer.

According to the above-mentioned structure, when the band discontinuity reduction layer cannot be formed directly on a surface of the active layer in the above-mentioned structure, the band discontinuity reduction layer can easily be formed by forming in advance the buffer layer between the active layer and the band discontinuity reduction layer and then forming the band discontinuity reduction layer on a surface of the buffer layer.

In addition, the above-mentioned buffer layer preferably has a thickness of 0.1 $\mu$m or less. This suppresses the disadvantage of the pile-up of carriers caused by the buffer layer due to the excess thickness of the buffer layer.

A semiconductor light modulator according to a second aspect of the present invention includes a semi-insulating substrate, a first conductivity type clad layer formed on the semi-insulating substrate, a second conductivity type clad layer having a conductivity type different from that of the first conductivity type clad layer and formed on the semi-insulating substrate in the same height position as the first conductivity type clad layer aligned with a prescribed space, and an active layer provided between the first conductivity type clad layer and the second conductivity type clad layer. The active layer is a multiple quantum well active layer having a barrier layer and a well layer, and includes a mixed crystal portion of the barrier layer and the well layer near the surface of the active layer that faces the clad layer.

According to the above-mentioned structure, the pile-up of carriers can be prevented because the mixed crystal portion functions as the band discontinuity reduction layer. As a result, the response speed of the semiconductor light modulator can be enhanced.

A semiconductor light modulator according to a third aspect of the present invention includes a semi-insulating substrate, a first conductivity type clad layer formed on the semi-insulating substrate, a second conductivity type clad layer having a conductivity type different from that of the first conductivity type clad layer and formed on the semi-insulating substrate in the same height position as the first conductivity type clad layer aligned with a prescribed space, and an active layer provided between the first conductivity type clad layer and the second conductivity type clad layer. The active layer includes an impurity of the first conductivity type near its surface that faces the first conductivity type clad layer.

According to the above-mentioned structure, the region near either side of the hetero junction is doped to be the first conductivity type. In other words, the hetero junction is surrounded by the region doped with the first conductivity type impurity. Therefore, the band discontinuity barrier becomes lower so that holes or electrons can pass over the discontinuity barrier more easily. As a result, the response speed of the semiconductor light modulator can be enhanced.

A semiconductor light modulator according to a fourth aspect of the present invention includes a semi-insulating substrate, a first conductivity type clad layer formed on the semi-insulating substrate, a second conductivity type clad layer having a conductivity type different from that of the first conductivity type clad layer and formed on the semi-insulating substrate in the same height position as the first conductivity type clad layer aligned with a prescribed space, and an active layer provided between the first conductivity type clad layer and the second conductivity type clad layer. The first conductivity type clad layer includes the same substance as a main component of the active layer as a main component.

According to the above-mentioned structure, the response speed of the semiconductor light modulator can be enhanced by lowering the hetero barrier and suppressing the pile-up of carriers (holes or electrons) as compared with a structure in which the first conductivity type clad layer includes a substance different from a main component of the active layer as a main component.

The features of the respective semiconductor light modulators according to the first through fourth aspects mentioned above may be combined with each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described with reference to the drawings.
First Embodiment First of all, a structure and a manufacturing method of a semiconductor light modulator according to this embodiment will be described with reference to FIG. 1.

Figure 1:
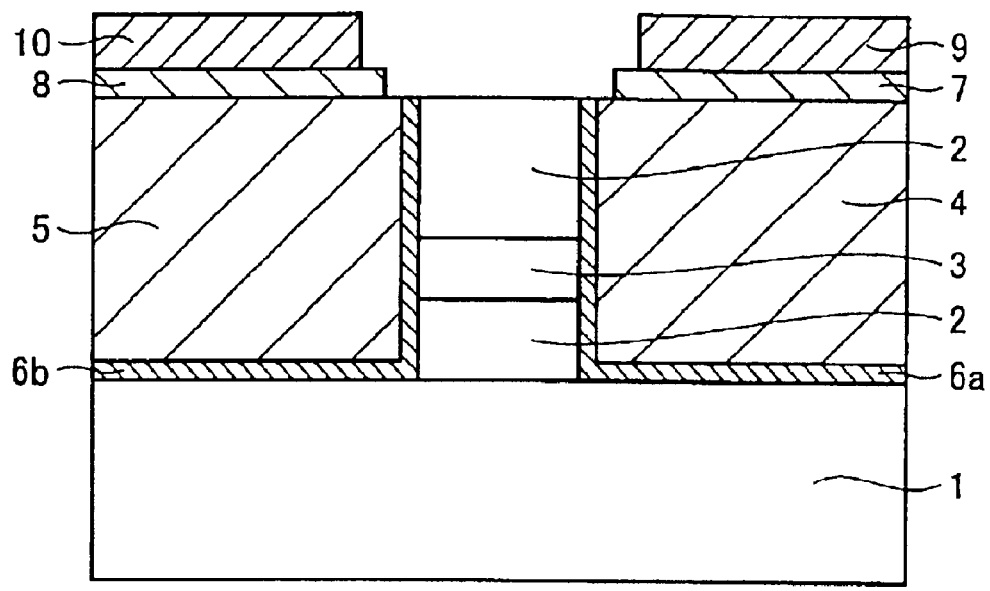
FIGS. 1 to 8 show first to eighth embodiments of a semiconductor light modulator.

As shown in FIG. 1, the semiconductor light modulator according to this embodiment includes a semi-insulating InP substrate 1, an i-InP clad layer 2 which is an intrinsic semiconductor layer, that is, a semi-insulating layer formed on semi-insulating InP substrate 1, and an MQW absorption layer 3 as an active layer sandwiched by i-InP clad layers 2 from upside and downside and formed to reach both ends of i-InP clad layer 2 in a direction parallel to a main surface of semi-insulating InP substrate 1.

It should be noted that, as the refractive index of light in i-InP clad layer 2 is smaller than that in MQW absorption layer 3, light input from the outside is confined in MQW absorption layer 3.

In addition, in the light modulator according to this embodiment, a p-InP clad layer 4 as a p-type clad layer is formed on one side of i-InP clad layer 2 and MQW absorption layer 3, and an n-InP clad layer 5 as an n-type clad layer is formed on semi-insulating InP substrate 1 on the other side of i-InP clad layer 2 and MQW absorption layer 3. I-InP clad layer 2 and MQW absorption layer 3 provided between p-InP clad layer 4 and n-InP clad layer 5 construct an optical waveguide of the semiconductor light modulator.

In addition, a band discontinuity reduction layer 6a including InGaAsP, having a band gap energy value between that of p-InP clad layer 4 and that of MQW absorption layer 3 to reduce the discontinuity of the band gap, is provided between p-InP clad layer 4 and semi-insulating InP substrate 1 as well as between p-InP clad layer 4 and i-InP clad layer 2/MQW absorption layer 3.

In addition, a band discontinuity reduction layer 6b including InGaAsP, having a band gap energy value between that of n-InP clad layer 5 and that of MQW absorption layer 3 to reduce the discontinuity of the band gap, is provided between n-InP clad layer 5 and semi-insulating InP substrate 1 as well as between n-InP clad layer 5 and i-InP clad layer 2/MQW absorption layer 3.

In addition, a p-InGaAs contact layer 7 doped with a p-type impurity to contact a p-type electrode is formed on an upper surface of p-InP clad layer 4, and an n-InGaAs contact layer 8 doped with an n-type impurity to contact an n-type electrode is formed on an upper surface of n-InP clad layer 5.

Furthermore, a p-type ohmic electrode 9 is formed on an upper surface of p-InGaAs contact layer 7, and an n-type ohmic electrode 10 is formed on an upper surface of n-InGaAs contact layer 8.

MQW absorption layer 3 is formed of an InGaAsP layer, and is designed to have a photoluminescence wavelength of around 1.49 $\mu$m. In addition, MQW absorption layer 3 has a width of approximately 1–3 $\mu$m.

The manufacturing method of the semiconductor light modulator according to this embodiment will now be described. In the manufacturing method of the semiconductor light modulator according to this embodiment, lower i-InP clad layer 2 shown in FIG. 1 (0.5 $\mu$m in thickness), MQW absorption layer 3, and upper i-InP clad layer 2 shown in FIG. 1 (2 $\mu$m in thickness) are sequentially grown on semi-insulating InP substrate 1 using a metal-organic chemical vapor deposition (MOCVD) method or a molecular beam epitaxy (MBE) method.

Then, after forming a stripe with 1–3 $\mu$m width on upper i-InP clad layer 2 with an insulating film such as a SiO$_2$ film, lower i-InP clad layer 2 shown in FIG. 1, MQW absorption layer 3, and upper i-InP clad layer 2 shown in FIG. 1 are respectively etched using the insulating film as a mask until semi-insulating InP substrate 1 is exposed to form the active layer that will become the optical waveguide.

Thereafter, band discontinuity reduction layer 6b including InGaAsP which has a band gap energy value between that of n-InP clad layer 5 and that of MQW absorption layer 3 to reduce a discontinuity of the band gap, n-InP clad layer 5 and n-InGaAs contact layer 8 are sequentially grown on the surfaces of semi-insulating InP substrate 1, i-InP clad layer 2 and MQW absorption layer 3.

Then, band discontinuity reduction layer 6a including InGaAsP which has a band gap energy value between that of p-InP clad layer 4 and that of MQW absorption layer 3 to reduce a discontinuity of the band gap, p-InP clad layer 4 and p-InGaAs contact layer 7 are sequentially grown on the surfaces of semi-insulating InP substrate 1, i-InP clad layer 2 and MQW absorption layer 3.

Herein, a condition for the film formation is set such that, the band gap energy value (Eg2) of InGaAsP band discontinuity reduction layer 6a will be between the band gap energy value (Eg0) of MQW absorption layer 3 and the band gap energy value (Eg1) of p-InP clad layer 4, i.e., the values will be Eg1>Eg2>Eg0.

In addition, a condition for the film formation is set such that, the band gap energy value (Eg2') of InGaAsP band discontinuity reduction layer 6b will be between the band gap energy value (Eg0) of MQW absorption layer 3 and the band gap energy value (Eg1') of n-InP clad layer 5, i.e., the values will be Eg1'>Eg2'>Eg0.

Finally, n-type ohmic electrode 10 and p-type ohmic electrode 9 are formed as shown in FIG. 1.

It is to be noted that, the band gap energy value of InGaAsP band discontinuity reduction layer 6 is adjusted by controlling a flow rate of raw material gas during the crystal growth of InGaAsP band discontinuity reduction layer 6. In addition, the condition for the film formation may be set such that the thickness of InGaAsP layer 6 will be about 0.1 μm on the side surface of MQW absorption layer 3.

According to the semiconductor light modulator of the embodiment mentioned above, the hetero barrier between MQW absorption layer 3 and p-InP clad layer 4 is lowered by sandwiching band discontinuity reduction layer 6a having the band gap energy value between that of MQW absorption layer 3 and that of p-InP clad layer 4 between MQW absorption layer 3 and p-InP clad layer 4. As a result, degradation of a response speed of an electric signal corresponding to an input of an optical signal can be suppressed because holes generated within MQW absorption layer 3 are fed to p-InP clad layer 4 without piling up at the hetero barrier.

In addition, the hetero barrier between MQW absorption layer 3 and n-InP clad layer 5 is lowered by sandwiching band discontinuity reduction layer 6b having the band gap energy value between that of MQW absorption layer 3 and that of n-InP clad layer 5 between MQW absorption layer 3 and n-InP clad layer 5. As a result, degradation of a response speed of an electric signal corresponding to an input of an optical signal can be suppressed because free electrons generated within MQW absorption layer 3 are fed to n-InP clad layer 5 without piling up at the hetero barrier.

Though the InGaAsP layers are used as band discontinuity reduction layers 6a and 6b in the light modulator of this embodiment, other semiconductor layer can be used so far as the values of band gap energy values Eg2 and Eg2' in band discontinuity reduction layers 6a, 6b will be in the relations Eg1>Eg2>Eg0 and Eg1'>Eg2'>Eg0.

In addition, each of band discontinuity reduction layers 6a, 6b is not limited to the layer formed of only one kind of layer. Rather, it may be formed by stacking multiple kinds of layers having different band gap energies.

Furthermore, though the band gap energy changes stepwise with band discontinuity reduction layers 6a, 6b in the semiconductor light modulator of this embodiment, it is also possible to use a material having a composition adjusted to make continuous change of the band gap energy as the band discontinuity reduction layer. In this example, the material composition for the band discontinuity reduction layer is also selected to satisfy the relations Eg1>Eg2>Eg0 and Eg1'>Eg2'>Eg0.

It should be noted that, though the example of forming both of band discontinuity reduction layers 6a and 6b is described for the semiconductor light modulator of this embodiment, the semiconductor light modulator having only one of band discontinuity reduction layers 6a and 6b formed thereon can also enhance the response speed by the above-mentioned effect obtained with one of band discontinuity reduction layers 6a and 6b.

In general, as a band discontinuity in an interface between the active layer and the p-InP clad layer causes degradation of the response speed, an insertion of band discontinuity reduction layer 6a will be most effective.

In addition, band discontinuity reduction layers 6a, 6b may either be doped or not doped with an impurity.

Second Embodiment

Figure 2:
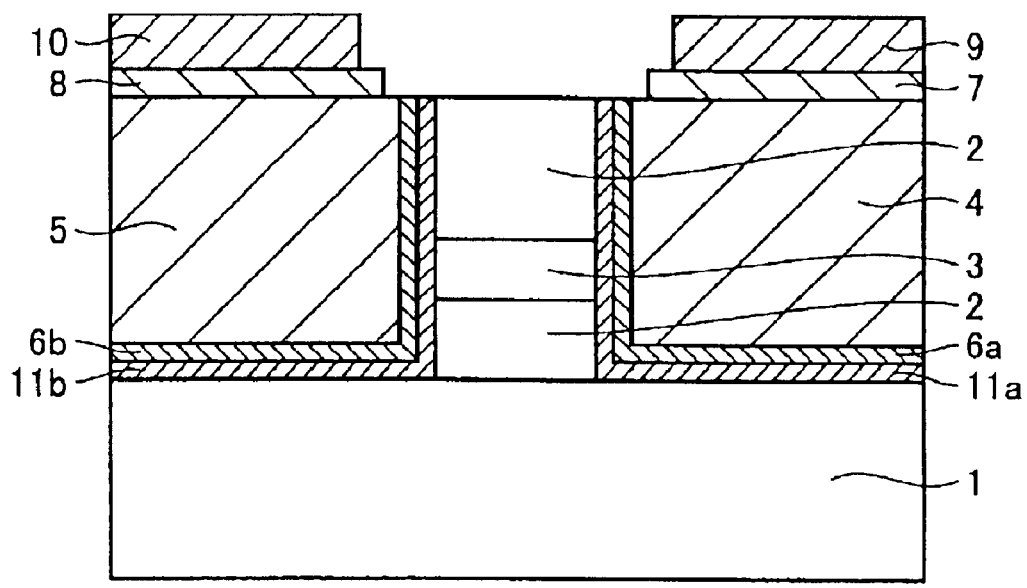

A structure and a manufacturing method of the semiconductor light modulator according to this embodiment will be described with reference to FIG. 2. As shown in FIG. 2, the structure of the semiconductor light modulator according to this embodiment is similar to that of the semiconductor light modulator shown in FIG. 1 in the first embodiment. In addition to the structure of the semiconductor light modulator in FIG. 1, however, an InP buffer layer 11a is provided between band discontinuity reduction layer 6a and MQW absorption layer 3/i-InP clad layer 2 as well as between band discontinuity reduction layer 6a and semi-insulating InP substrate 1. Furthermore, in addition to the structure of the semiconductor light modulator in FIG. 1, an InP buffer layer 11b is provided between band discontinuity reduction layer 6b and MQW absorption layer 3/i-InP clad layer 2 as well as between band discontinuity reduction layer 6b and semi-insulating InP substrate 1.

InP buffer layers 11a, 11b are formed by crystal growth between MQW absorption layer 3 and band discontinuity reduction layers 6a, 6b including InGaAsP. It is to be noted that, a desired thickness of each of InP buffer layers 11a, 11b is 0.1 μm or less.

In the manufacturing method of the semiconductor light modulator of the first embodiment, band discontinuity reduction layers 6a, 6b formed by InGaAsP layers are directly grown on side surfaces of MQW absorption layer 3. In practice, however, when growing band discontinuity reduction layers 6a, 6b, it is difficult to directly grow the InGaAsP layers on the surfaces of semi-insulating InP substrate 1, MQW absorption layer 3 and i-InP clad layer 2.

For this reason, in the manufacturing method of the semiconductor light modulator of this embodiment, InP buffer layers 11a, 11b are firstly grown with small thickness such as 0.1 μm or less, and then InGaAsP band discontinuity reduction layers 6a, 6b are grown on the surfaces of InP buffer layers 11a, 11b.

It is to be noted that, if the thickness of each of InP buffer layers 11a, 11b is more than 0.1 μm, the pile-up problem as mentioned above will occur because of the existence of the hetero barriers between InP buffer layers 11a, 11b and MQW absorption layer 3. Therefore, it is desirable to ideally form each of InP buffer layers 11a, 11b with the thickness not causing the pile-up of electrons or holes due to the hetero barrier, e.g., with the thickness of about 10 nm or less.

It should be noted that, though the example of forming both InP buffer layers 11a, 11b is described for the semiconductor light modulator of this embodiment, if the semiconductor light modulator has only one of band discontinuity reduction layers 6a, 6b formed thereon, the InP buffer layer may be provided only on the side of the formed one of band discontinuity reduction layers 6a, 6b to enhance the response speed of the semiconductor light modulator by suppressing the pile-up of either electrons or holes.

Third Embodiment

Figure 3:
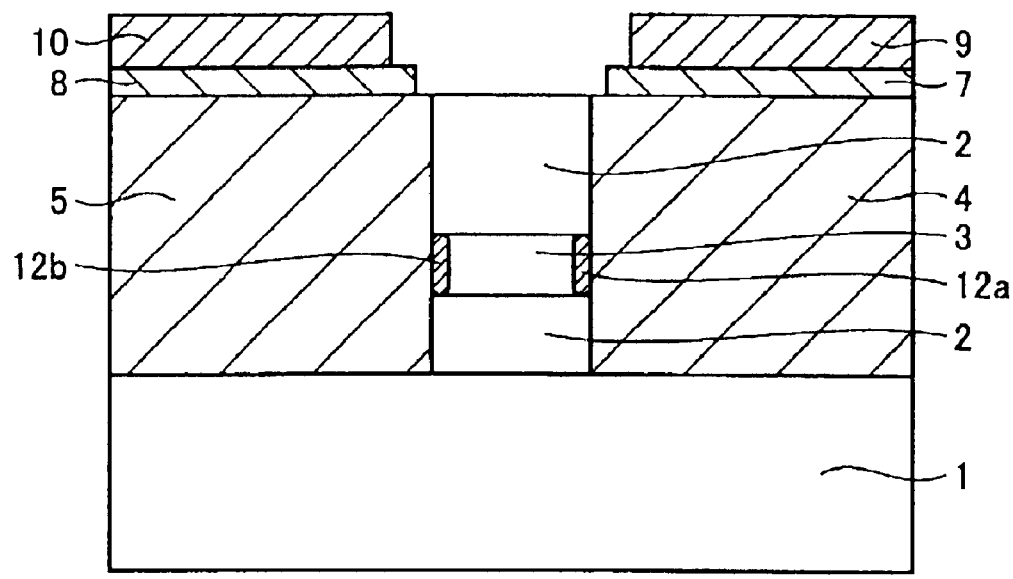

A structure and a manufacturing method of the semiconductor light modulator according to this embodiment will be described with reference to FIG. 3. Though the structure of the semiconductor light modulator according to this embodiment is similar to that of the semiconductor light modulator of the first embodiment shown in FIG. 1, this semiconductor light modulator includes disorder regions 12a, 12b having disordered MQW absorption layer 3 on both ends of MQW absorption layer 3 in place of band discontinuity reduction layers 6a, 6b shown in FIG. 1.

In the manufacturing method of the semiconductor light modulator of this embodiment, after forming i-InP clad layer 2 and MQW absorption layer 3 as the optical waveguide and before starting the crystal growth of n-InP clad layer 5 and p-InP clad layer 4, disorder regions 12a, 12b, each having a composition that is intermediate between that of the well layer and the barrier layer in MQW absorption layer 3, are formed by diffusing an impurity into MQW absorption layer 3 from both side end surfaces of MQW absorption layer 3. Disorder regions 12a can easily be formed by, for example, thermal diffusion of Zn ion into MQW absorption layer 3 from one side end surface of MQW absorption layer 3, or ion implantation of Zn ion. Disorder regions 12b can easily be formed by, for example, thermal diffusion of Si ion into MQW absorption layer 3 from the other side end surface of MQW absorption layer 3, or ion implantation of Si ion.

Thereafter, n-InP clad layer 5 and p-InP clad layer 4 are grown to contact with either side surface of i-InP clad layer 2 and MQW absorption layer 3 forming the optical waveguide. Thus, disorder region 12a as a band discontinuity reduction portion having a band gap energy value between that of MQW absorption layer 3 and that of p-InP clad layer 4 can be formed between the center portion of MQW absorption layer 3 and p-InP clad layer 4. In addition, disorder region 12b as a band discontinuity reduction portion having a band gap energy value between that of MQW absorption layer 3 and that of n-InP clad layer 5 can be formed between the center portion of MQW absorption layer 3 and n-InP clad layer 5.

Though the example of utilizing disorder caused by the impurity diffusion is shown herein, and though the example of the impurity diffusion or implantation is shown herein as an exemplary procedure to make mixed crystal of the well layer and the barrier layer in MQW absorption layer 3, the effect of the enhanced response speed of the semiconductor light modulator as mentioned above can also be obtained with other procedure so far as the mixed crystal of the well layer and the barrier layer in MQW absorption layer 3 can be made.

In addition, though the example of forming both disorder regions 12a and 12b is described for the semiconductor light modulator of this embodiment, the response speed of the semiconductor light modulator can be enhanced even with the semiconductor light modulator having only one of disorder regions 12a and 12b formed thereon because of the suppression effect of the pile-up of carriers as mentioned above obtained by either one of disorder regions 12a, 12b.

Fourth Embodiment

Figure 4:
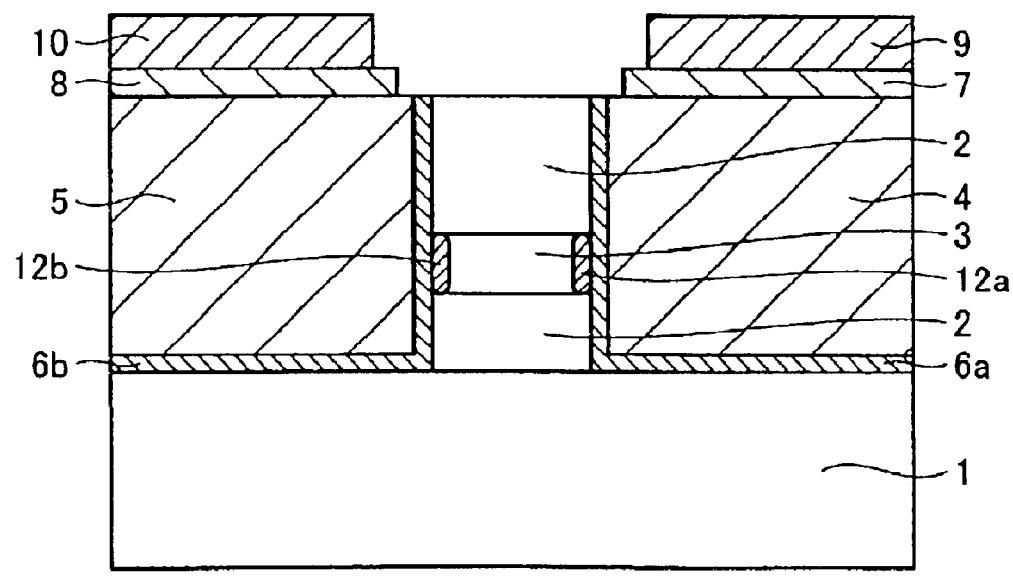

The semiconductor light modulator according to this embodiment will be described with reference to FIG. 4. The semiconductor light modulator according to this embodiment includes both of band discontinuity reduction layers 6a, 6b of the semiconductor light modulator in the first embodiment and disorder regions 12a, 12b of the semiconductor light modulator in the third embodiment so that, it can further reduce the pile-up of carriers due to the hetero barrier as compared with those examples including only either of them.

Thus, in the semiconductor light modulator according to this embodiment, the hetero barrier between disorder region 12a and p-InP clad layer 4 can be made lower than that in the semiconductor light modulator in the third embodiment by setting the band gap energy value of band discontinuity reduction layer 6a including InGaAsP to be between that of p-InP clad layer 4 and that of disorder region 12a in MQW absorption layer 3.

In addition, in the semiconductor light modulator according to this embodiment, the hetero barrier between disorder region 12b and n-InP clad layer 5 can be made lower than that in the semiconductor light modulator in the third embodiment by setting the band gap energy value of band discontinuity reduction layer 6b including InGaAsP to be between that of n-InP clad layer 5 and that of disorder region 12b in MQW absorption layer 3.

Therefore, it is possible to further enhance the response speed of the semiconductor light modulator as compared with that in the first and third embodiments.

Fifth Embodiment

Figure 5:
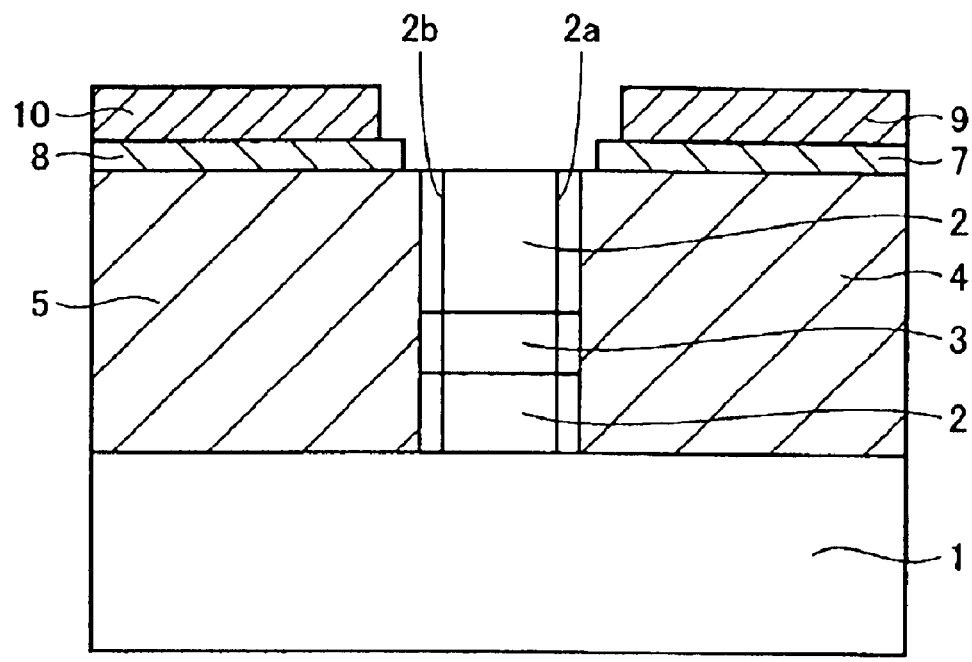

A structure and a manufacturing method of the semiconductor light modulator according to this embodiment will be described with reference to FIG. 5. The structure of the semiconductor light modulator according to this embodiment is similar to that of the semiconductor light modulator of the first embodiment shown in FIG. 1 except that, p-type and n-type doping fronts 2a, 2b are formed inside the active layer, i.e., inside i-InP clad layer 2 and MQW absorption layer 3.

In addition, the manufacturing method of the semiconductor light modulator according to this embodiment is characterized in that, after forming MQW absorption layer 3 and i-InP clad layer 2 as the optical waveguide and during the growth of n-InP clad layer 5 and p-InP clad layer 4, an n-type dopant is diffused into MQW absorption layer 3 from n-InP clad layer 5 whereas a p-type dopant is diffused into MQW absorption layer 3 from p-InP clad layer 4. Commonly, n-InP clad layer 5 and p-InP clad layer 4 are doped with impurity to a concentration of about $1 \times 10^{18}$ cm$^{-3}$.

With this diffusion of the n-type or p-type impurity (dopant) from either side end surface of MQW absorption layer 3 during the crystal growth of n-InP clad layer 5 or p-InP clad layer 4, p-type and n-type doping fronts 2a, 2b are formed in MQW absorption layer 3.

As a result, the hetero barrier at the interface between p-InP clad layer 4 and MQW absorption layer 3 is doped to the p-type, that is, it enters the p-type impurity region, while the hetero barrier at the interface between n-InP clad layer 5 and MQW absorption layer 3 is doped to the n-type, that is, it enters the n-type impurity region.

Generally, when a hetero barrier is doped with an impurity, the hetero barrier becomes lower so that holes or electrons can pass over the hetero barrier more easily as compared with that without doping.

As a result, the undesirable effect of the pile-up of holes or electrons caused by the hetero barrier existing only at the interface between p-InP clad layer 4 and MQW absorption layer 3 or only at the interface between n-InP clad layer 5 and MQW absorption layer 3 can be suppressed. Therefore, the response speed of the semiconductor light modulator is enhanced.

It is to be noted that, though the n-type dopant is diffused into MQW absorption layer 3 from n-InP clad layer 5 and the p-type dopant is diffused into MQW absorption layer 3 from p-InP clad layer 4 in the semiconductor light modulator in this embodiment, the response speed of the semiconductor light modulator can also be enhanced with the semiconductor light modulator only having the p-type dopant diffused into MQW absorption layer 3 because the pile-up of holes is suppressed.

Sixth Embodiment

Figure 6:
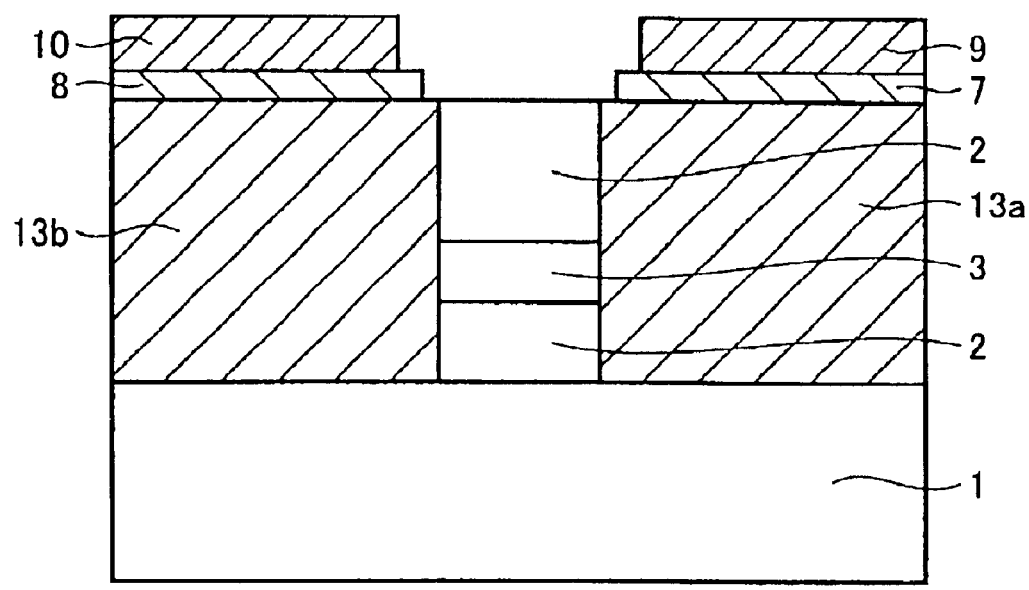

A structure and a manufacturing method of the semiconductor light modulator according to this embodiment will be described with reference to FIG. 6. The structure of the semiconductor light modulator according to this embodiment is similar to that of the semiconductor light modulator of the first embodiment shown in FIG. 1 except that, a p-InGaAsP clad layer 13a and an n-InGaAsP clad layer 13b are formed in place of p-InP clad layer 4 and n-InP clad layer 5, and band discontinuity reduction layers 6a, 6b shown in FIG. 1 are not provided.

In addition, the manufacturing method of the semiconductor light modulator according to this embodiment is similar to that of the semiconductor light modulator of the first embodiment except that, after forming MQW absorption layer 3 and i-InP clad layer 2 as the optical waveguide, the n-type clad layer and the p-type clad layer are grown not with the InP layer but with the InGaAsP layer.

According to the semiconductor light modulator of this embodiment, the band gap energy due to the hetero barrier between MQW absorption layer 3 and the n-type clad layer can be made smaller, and the hetero barrier between MQW absorption layer 3 and the p-type clad layer can be made smaller as compared with the example of forming the n-type clad layer and the p-type clad layer with the InP layer.

It is to be noted that, in the semiconductor light modulator of this embodiment, the band gap energies of InGaAsP clad layers 13a, 13b should be larger than that of MQW absorption layer 3. The band gap energies of InGaAsP clad layers 13a, 13b may become larger continuously or stepwise in the region further away from MQW absorption layer 3 by changing the compositions of InGaAsP clad layers 13a, 13b continuously or stepwise corresponding to the distance from MQW absorption layer 3.

In addition, though the example of forming both the n-type clad layer and the p-type clad layer with the InGaAsP layers is shown for the semiconductor light modulator of this embodiment, the response speed of the semiconductor light modulator can be enhanced by forming only one of the n-type clad layer and the p-type clad layer with the InGaAsP layer to suppress the pile-up of either holes or electrons.

Seventh Embodiment

Figure 7:
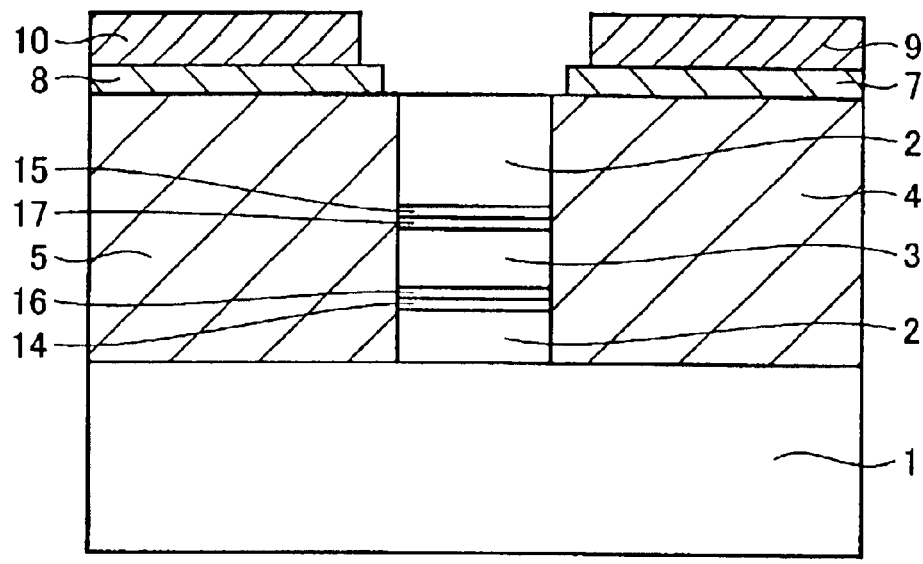

A structure and a manufacturing method of the semiconductor light modulator according to this embodiment will be described with reference to FIG. 7. The structure of the semiconductor light modulator according to this embodiment is similar to that of the semiconductor light modulator of the first embodiment shown in FIG. 1. As shown in FIG. 7, however, this semiconductor light modulator does not include band discontinuity reduction layers 6a, 6b shown in FIG. 1, and instead, a p-InGaAsP layer 17 and a p$^-$-InP layer 15 which has a lower impurity concentration than that of the p-type clad layer are formed on the upper main surface of MQW absorption layer 3, and an n$^-$-InP layer 14 which has a lower impurity concentration than that of the n-type clad layer and an n-InGaAsP layer 16 are formed to contact with the lower main surface of MQW absorption layer 3.

In general, when a crystal is grown by the MOCVD or MBE method, materials having different compositions can easily be stacked in the vertical direction. Thus, in the manufacturing method of the semiconductor light modulator according to this embodiment, n-InGaAsP layer 16 formed on n$^-$-InP layer 14 has such composition that the band gap energy becomes smaller in the upper region. Then, after growing MQW absorption layer 3, p-InGaAsP layer 17 is formed with such composition that the band gap energy becomes larger in the upper region.

Then, after growing p$^-$-InP layer 15 on p-InGaAsP layer 17, i-InP layer 2 is grown. The optical waveguide is formed thereafter, and n-InP clad layer 5 and p-InP clad layer 4 are grown to contact with either side surface of the optical waveguide.

As described above, according to the semiconductor light modulator of this embodiment, a voltage can be applied to MQW absorption layer 3 from the main surface side of MQW absorption layer 3, that is, from upside and downside of MQW absorption layer 3. Therefore, holes can be drawn from MQW absorption layer 3 to p$^-$-InP layer 15 located above MQW absorption layer 3 and p-InP clad layer 4, while electrons can be drawn from MQW absorption layer 3 to n$^-$-InP layer 14 located below MQW absorption layer 3 and n-InP clad layer 5. As a result, as the pile-up of holes or electrons due to two hetero barriers can be suppressed, the response speed of the semiconductor light modulator can be enhanced as compared with the example of drawing electrons and holes laterally.

In other words, the semiconductor light modulator includes an active layer provided between the first conductivity type clad layer and the second conductivity type clad layer so as to contact with both the first and second conductivity type clad layers. The semiconductor light modulator according to this embodiment includes a first conductivity type layer having the same conductivity type as the first conductivity type clad layer and provided so as to contact with both the first and second conductivity type clad layers and to contact with one main surface of the active layer.

The semiconductor light modulator includes a second conductivity type layer having the same conductivity type as the second conductivity type clad layer and provided so as to contact with both the first and second conductivity type clad layers and to contact with the other main surface of the active layer. The first conductivity type layer has a band gap energy larger than that of the active layer and smaller than that of the first conductivity type clad layer.

The semiconductor light modulator comprises a first conductivity type impurity layer provided to contact with both the first and second conductivity type clad layers and to contact with the main surface of said first conductivity type layer which is opposite to said active layer, and, having the same conductivity type as the first conductivity type clad layer and an impurity concentration lower than that of said first conductivity type clad layer. The semiconductor light modulator comprises a second conductivity type impurity layer provided to contact with both said first and second conductivity type clad layers and to contact with the main surface of said second conductivity type layer which is opposite to said active layer, and having the same conductivity type as the second conductivity type clad layer and an impurity concentration lower than that of said second conductivity type clad layer.

Eighth Embodiment

Figure 8:
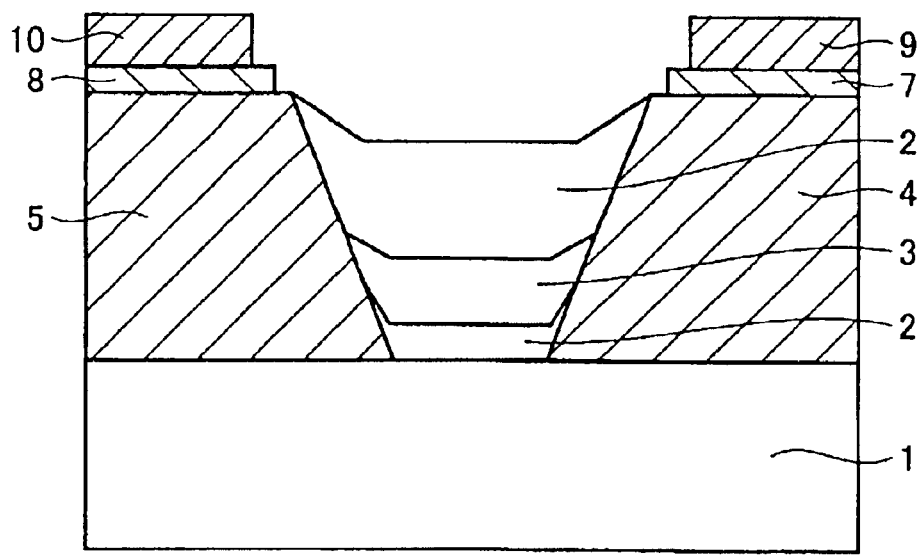

A structure and a manufacturing method of the semiconductor light modulator according to this embodiment will be described with reference to FIG. 8. The structure of the semiconductor light modulator according to this embodiment is similar to that of the semiconductor light modulator of the first embodiment shown in FIG. 1. In the semiconductor light modulator according to this embodiment, a cross-sectional structure of the portion to be the optical waveguide is formed to be an inverted trapezoidal shape, and MQW absorption layer 3 is formed on the inclined portion of the inverted trapezoidal shape as well as on semi-insulating InP substrate 1. In addition, the thickness of MQW absorption layer 3 becomes smaller in the region near the p-type clad layer or the n-type clad layer, and the thickness gradually becomes smaller as the region approaches to the p-type clad layer or the n-type clad layer.

According to the structure mentioned above, the pile-up of carriers can be suppressed as a band gap energy reduction portion is formed in the portion of MQW absorption layer 3 having a decreasing thickness.

In the manufacturing method of the semiconductor light modulator according to this embodiment, the clad layer for forming n-InP clad layer 5 and p-InP clad layer 4 is firstly grown on semi-insulating InP substrate 1, and then the region of the clad layer in which MQW absorption layer 3 and i-InP clad layer 2 as the optical waveguide will be formed is removed by an etching.

In this example, an etchant (for example, a mixture of sulfuric acid, hydrogen peroxide and pure water) for use is selected such that the cross-section of the etched portion of the clad layer will become the inverted trapezoidal shape. Thereafter, lower i-InP clad layer 2, MQW absorption layer 3 and upper i-InP clad layer 2 are sequentially grown in the etched portion. Generally, a speed of a crystal growth is slower in an inclined portion than in a flat portion. As a result, the thickness of MQW absorption layer 3 will be smaller in the inclined portion than in the flat portion.

In MQW absorption layer 3, as the thickness of the well layer and the barrier layer becomes extremely small in the inclined portion, a layer having a composition that is intermediate between that of the well layer and the barrier layer is partially formed. This inclined portion of MQW absorption layer 3, having the layer with the composition that is intermediate between that of the well layer and the barrier layer formed therein, functions as the band discontinuity reduction portion between the flat portion of MQW absorption layer 3 and n-InP clad layer 5 and p-InP clad layer 4 respectively formed to contact with either side surface of MQW absorption layer 3, and therefore the pile-up of electrons or holes can be suppressed. As a result, the response speed of the semiconductor light modulator can be enhanced.

In other words, structure of the semiconductor light modulator according to this embodiment includes an active layer provided between the first conductivity type clad layer and the second conductivity type clad layer and having a smaller thickness in the region near the first conductivity type clad layer.

It should be noted that, the features of the respective semiconductor light modulators according to the first through eighth embodiments mentioned above may be combined with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor light modulator, comprising:
   a semi-insulating substrate;
   a first conductivity type cladding layer on said semi-insulating substrate;
   a second conductivity type cladding layer having a conductivity type different from that of said first conductivity type cladding layer and on said semi-insulating substrate, opposite and separated from said first conductivity type cladding layer;
   an active layer located between said first conductivity type cladding layer and said second conductivity type cladding layer; and
   a band discontinuity reduction layer located between said active layer and said first conductivity type cladding layer and having a band gap energy larger than that of said active layer and smaller than that of said first conductivity type cladding layer.

2. The semiconductor light modulator according to claim 1, wherein said band discontinuity reduction layer includes a plurality of stacked layers having different, respective band gap energies.

3. The semiconductor light modulator according to claim 1, wherein said band discontinuity reduction layer has a band gap energy that changes stepwise.

4. The semiconductor light modulator according to claim 1, wherein said band discontinuity reduction layer has a band gap energy that changes continuously.

5. The semiconductor light modulator according to claim 1, comprising a buffer layer located between said active layer and said band discontinuity reduction layer and having a thickness enabling tunneling of electrons or holes through said buffer layer, wherein said buffer layer is a material that enables said band discontinuity reduction layer to be formed directly on said buffer layer.

6. The semiconductor light modulator according to claim 5, wherein said buffer layer has a thickness of no more than 0.1 $\mu$m.

7. A semiconductor light modulator, comprising:
   a semi-insulating substrate;
   a first conductivity type cladding layer on said semi-insulating substrate;
   a second conductivity type cladding layer having a conductivity type different from that of said first conductivity type cladding layer and on said semi-insulating substrate, opposite and spaced from said first conductivity type cladding layer; and
   an active layer located between said first conductivity type cladding layer and said second conductivity type cladding layer, wherein said active layer has a multiple quantum well structure having at least one barrier layer and at least one well layer, and includes a disordered portion that is a mixture of said barrier layer and said well layer at a surface of said active layer that faces said first conductivity type cladding layer.

8. The semiconductor light modulator according to claim 7, wherein said disordered portion is formed by introducing an impurity into a part of said active layer.

9. A semiconductor light modulator, comprising:
   a semi-insulating substrate;
   a first conductivity type cladding layer on said semi-insulating substrate;
   a second conductivity type cladding layer having a conductivity type different from that of said first conductivity type cladding layer and on said semi-insulating substrate, opposite and spaced from said first conductivity type cladding layer; and
   an active layer located between said first conductivity type cladding layer and said second conductivity type cladding layer, wherein only a portion of said active layer located adjacent to a surface of said active layer that faces said first conductivity type cladding layer includes an impurity producing the first conductivity type.

10. The semiconductor light modulator according to claim 9, wherein said active layer has a multiple quantum well structure.

11. A semiconductor light modulator, comprising:
    a semi-insulating substrate;
    a first conductivity type cladding layer on said semi-insulating substrate;
    a second conductivity type cladding layer having a conductivity type different from that of said first conductivity type cladding layer and on said semi-insulating substrate, opposite and spaced from said first conductivity type cladding layer; and
    an active layer located between said first conductivity type cladding layer and said second conductivity type cladding layer, wherein said first conductivity type cladding layer has a band gap energy increasing step wise with distance from an end of said active layer.

12. A semiconductor light modulator comprising:

a semi-insulating substrate;

a first conductivity type cladding layer on said semi-insulating substrate;

a second conductivity type cladding layer having a conductivity type different from that of said first conductivity type cladding layer and on said semi-insulating substrate, opposite and spaced from said first conductivity type cladding layer; and an active layer located between said first conductivity type cladding layer and said second conductivity type cladding layer, wherein said first conductivity type cladding layer has a band gap energy increasing continuously with distance from an end of said active layer.

* * * * *